April 4, 1961  G. S. DOMAN ET AL  2,978,038
SWASH PLATE OPERATING MECHANISM AND COMBINATION WITH SWASH PLATE
Filed March 11, 1958  3 Sheets-Sheet 1

INVENTORS
GLIDDEN S. DOMAN
STEPHEN DuPONT
RICHARD W. BEWLEY
BY Bohleber, Fawcett & Montstream
ATTORNEYS April 4, 1961   G. S. DOMAN ET AL   2,978,038
SWASH PLATE OPERATING MECHANISM AND COMBINATION WITH SWASH PLATE
Filed March 11, 1958   3 Sheets-Sheet 2
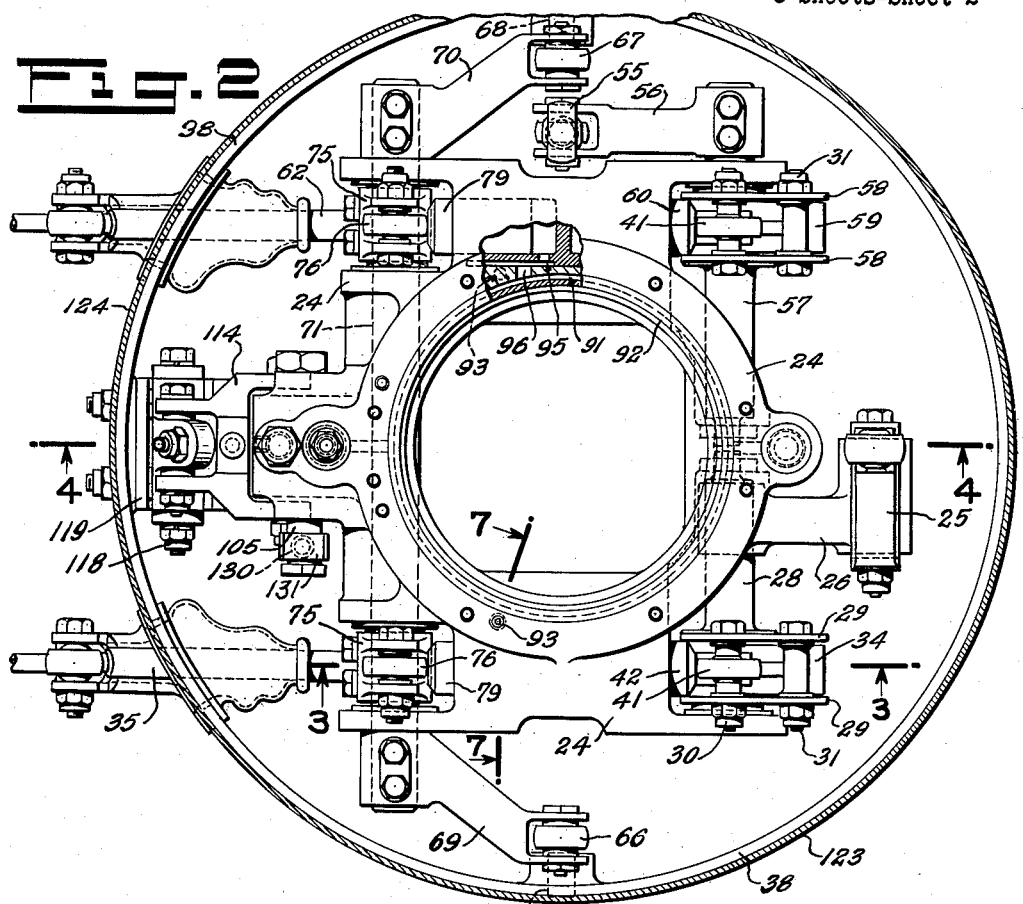
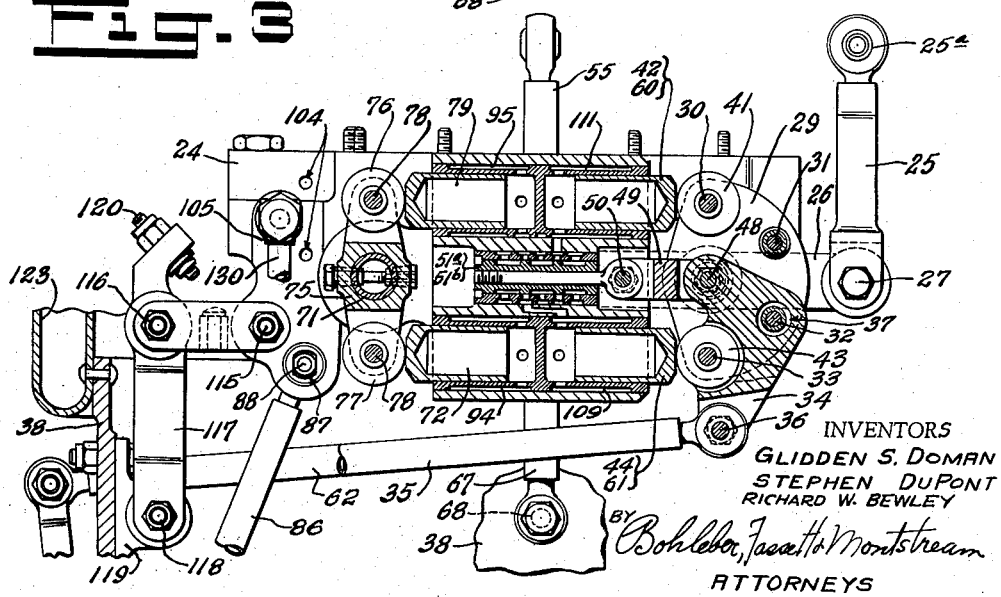
INVENTORS
GLIDDEN S. DOMAN
STEPHEN DuPONT
RICHARD W. BEWLEY
BY
ATTORNEYS

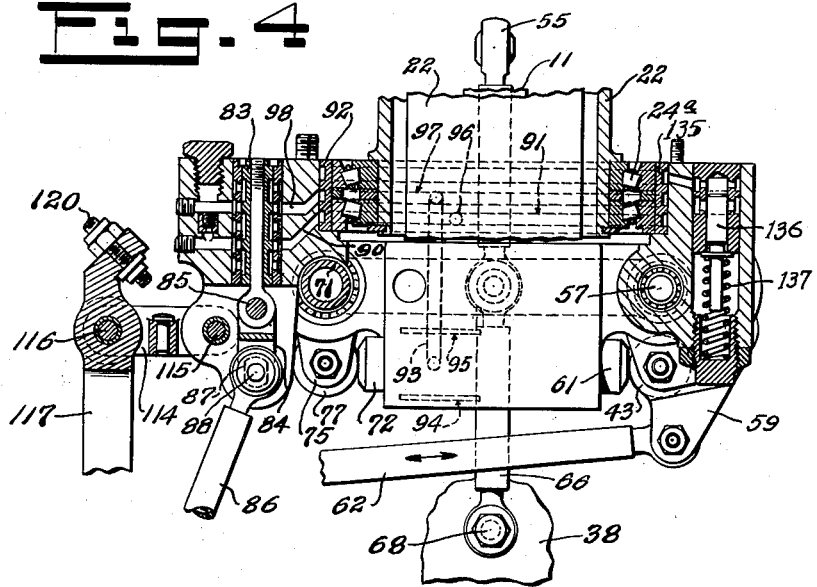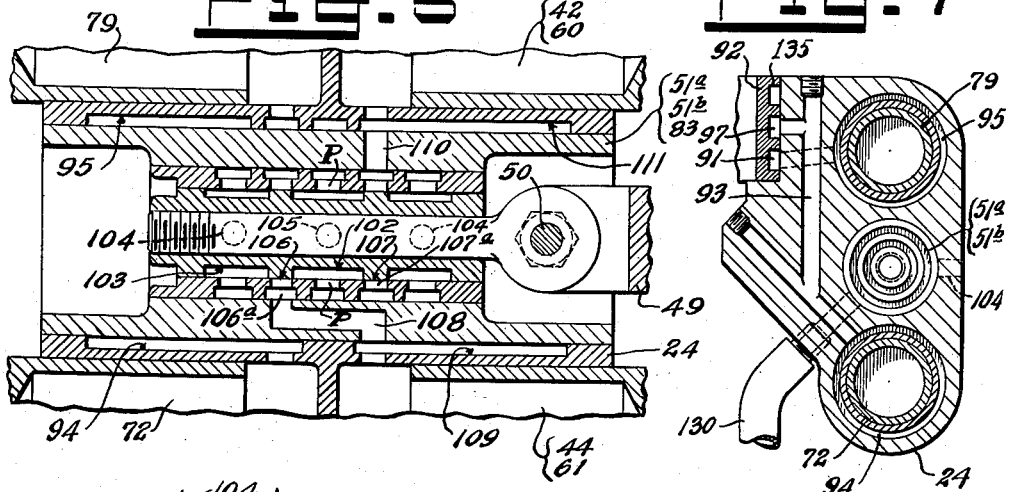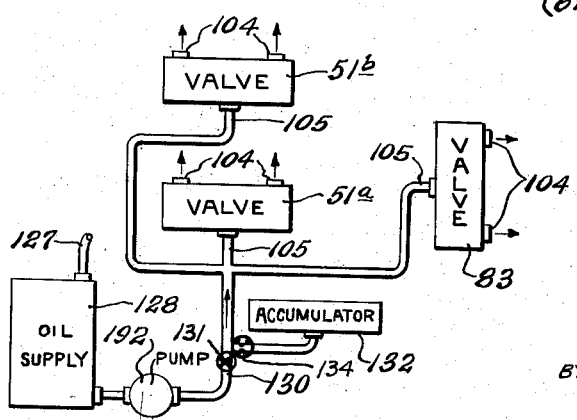

United States Patent Office 2,978,038
Patented Apr. 4, 1961

2,978,038

SWASH PLATE OPERATING MECHANISM AND COMBINATION WITH SWASH PLATE

Glidden S. Doman, Trumbull, Stephen du Pont, Southbury, and Richard W. Bewley, Southport, Conn.; said Doman and said Du Pont assignors to Doman Helicopters, Inc., Danbury, Conn., a corporation of Delaware Filed Mar. 11, 1958, Ser. No. 720,676

10 Claims. (Cl. 170—160.25)

The invention relates to a swash plate mechanism for helicopter rotor heads with hydraulic servo means which changes the angularity of the swash plate fore and aft and also laterally for cyclic pitch control of the blades and also raises and lowers the relative position of the swash plate mechanism on the pylon or mast for collective pitch control of the blades of the rotor head. Fluid systems of this kind use an oil intended for this purpose only and having no, or extremely limited, lubrication qualities. It is for this reason that particular care must be taken that there be no leakage of hydraulic fluid into the lubricating oil with which helicopter parts are lubricated in order to prevent contamination of the lubricating oil. By mounting the entire hydraulic servo means on the swash plate frame and using the same transmission lubricating oil as the hydraulic fluid in the hydraulic servo system, there can be no contamination of the lubricating oil by leakage. In fact it aids in lubricating the head. In addition the helicopter uses a single oil reservoir instead of using two different oil reservoirs which reduces cost and weight of the installation. The pressure of the oil used as hydraulic pressure is about 400 pounds so that usually one high pressure pump of low capacity is used for the servo system and a lower pressure pump of high capacity is used for delivery of oil intended for lubrication.

Again, using lubricating oil as the hydraulic fluid in the servo system leakage is no problem and the cost of the installation can be further reduced by eliminating packing which also substantially reduces friction resistance. No precautions need be taken to avoid leakage at fluid connections and since special and more expensive couplings are used when leakage is to be avoided this effects additional savings. Furthermore the return pipe for the hydraulic servo means can be dispensed with and the oil outleted into the head chamber to assist in lubricating the parts therein and dispensing with the return pipe thereby further saving expense and further lightening the weight of the equipment.

It is an object of the invention to construct a swash plate mechanism with a hydraulic servo means for helicopters which adjusts the swash plate for cyclic pitch control and for collective pitch control which servo means is housed within the swash plate structure and uses transmission lubricating oil as the hydraulic fluid so that leakage creates no lubricating problem and parts may be dispensed with.

Another object of the invention is to construct a compact hydraulic servo system for helicopters in which both the servo mechanism for tilting the swash plate for cyclic pitch control and for elevating the swash plate for collective pitch control are mounted on the swash plate frame.

Another object is to construct a swash plate mechanism using a compact hydraulic servo means.

A still further object is to construct a compact hydraulic servo means using a double motor for collective pitch control.

Another object is to construct an hydraulic servo means having a new and novel valve operating mounting.

Other objects of the invention will be more apparent from the following description when taken in connection with the accompanying drawings illustrating a preferred embodiment thereof in which:

Fig. 2 is a top view of the swash plate mechanism taken on line 2—2 of Fig. 1;

Fig. 3 is a section through one set of servo motors and a valve taken on line 3—3 of Fig. 2;

Fig. 4 is a vertical section through the swash plate mechanism taken on line 4—4 of Fig. 2;

Fig. 5 is an enlarged view of the valve used;

Fig. 6 is a schematic drawing of the hydraulic system to feed fluid under pressure to the valves; and Fig. 7 is a section taken on line 7—7 of Fig. 2.

Figure 1:
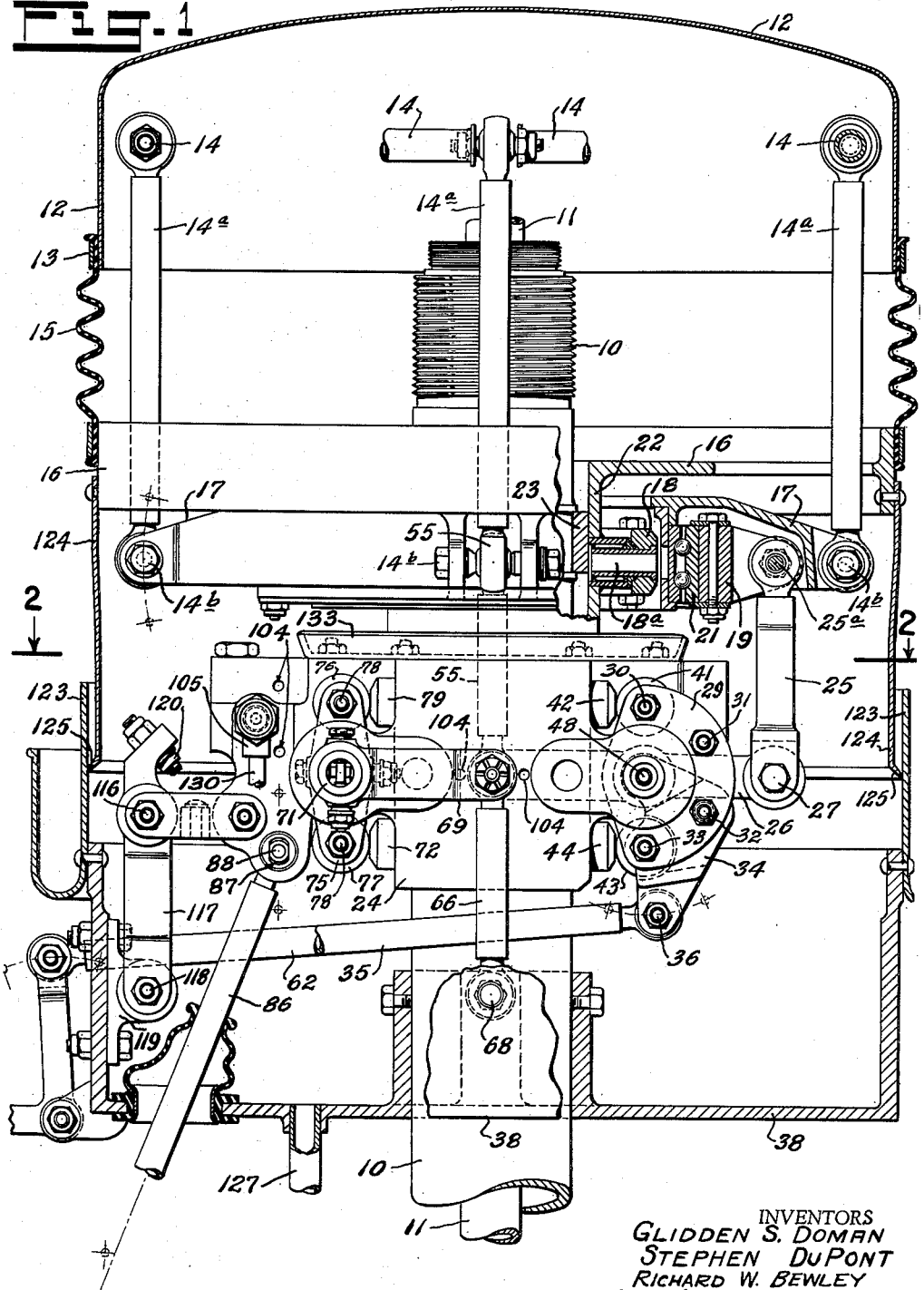
Fig. 1 is an overall side elevation of the swash plate mechanism and rotor head with the swash plate driving sleeve and with part of the swash plate in section.

The rotor head is mounted on the pylon or mast 10 of the helicopter through which passes a drive shaft 11 for rotating the rotor head housing 12. This rotor head mounts blades for cyclic pitch change, each blade having a spar which spar projects into the housing and are connected by a horn 14, link 14a and pivot 14b to a swash plate 17. The swash plate mechanism shown has four links and horns for a four bladed rotor head. Rotor heads are well known; that shown in Doman 2,810,443, dated October 22, 1957 is a preferred type. The rotor head is shown as directly connected with the swash plate through a drive sleeve 15 one end of which is connected with the rotor head housing 12 and the other end is connected with a drive plate 16 for the swash plate and rotates the swash plate 17 through a swash plate sleeve 22 carrying a universal joint 18 as is well known of which one gimbal pin 18a is shown. The rotor head is therefore directly connected with the swash plate means through the drive sleeve 15 which is axially flexible so that the relative inclination of the rotor head nor the vertical movement of the swash plate mechanism for collective pitch control does not affect the rotation of the swash plate 17. The swash plate mechanism includes a stationary ring 19 mounted on the rotory swash plate 17 by a bearing 21 to which two hydraulic servo motors are connected for cyclic pitch control of the blades. The drive sleeve 15 also serves as an enclosing housing. The rotor head in the Doman patent above is mounted on the pylon by means of a universal joint and the drive shaft is connected with the head to rotate the same through a universal joint which preferably is in center alignment with the universal joint for the head. The swash plate sleeve 22 and hence the entire swash plate mechanism is mounted for vertical movement on the pylon such as by bearings 23 for collective pitch control of the blades.

The swash plate mechanism includes a stationary swash plate or servo frame 24 which is mounted on the swash plate sleeve through a bearing 24a so that raising or lowering of this frame moves the swash plate sleeve and swash plate vertically. The swash plate mechanism has fore and aft tilt operating means connected with the swash plate ring 19 which inclines the swash plate 17 in a fore and aft direction. This tilt operating means includes a link 25 connected at one end to the stationary swash plate ring 19 by a bolt 25a and the other end is connected with a lever 26 through a pivot 27. This lever is carried by a pivot shaft 28 which is suitably mounted on the swash plate or servo frame. A cross arm 29 forms a part of the pivot shaft and bell crank which cross arm comprises a pair of spaced plates which are secured together by suitable means such as bolts 30, 31, 32 and 33 and a spacer bushing is used on at least the bolts 31 and 32 when they are standard straight bolts.

The valve operating means includes a valve lever 34 pivotally mounted on the bolt 33 to which lever is connected an operating link 35 by a pivot 36. This operating link passes through a bottom frame 38 fixed to the aircraft or pylon and is connected in known fashion with the control stick of the aircraft. The bell crank 34 has an enlarged hole 37 through which the bolt 32 and its spacer passes. The operating connection described permits manual operation of the cross bar 29 for the fore and aft tilt operating means in that any movement of the link 35 pivots the valve bell crank 34 until the bolt 32 engages the sides of the hole 37 whereupon any further movement of the bell crank pivots the cross arm 29 and hence raises or lowers the link 25 to give fore and aft tilt of the swash plate.

The bolt 30 of the cross arm 29 also carries a roller 41 which is engaged by a piston 42 of an hydraulic servo means. The bolt 33 carries a roller 43 which is engaged by a piston 44 of the hydraulic servo means. The piston 44 when energized or operated by hydraulic fluid swings the cross arm 29 so that the link 25 is projecting upwardly. Actuation of the piston 42 to the right swings the cross arm in a clockwise direction to move the link 25 downwardly and tilt the swash plate downwardly.

The valve lever 34 carries a pivot 48 on which is mounted a valve link 49 which link is pivotally connected through a pivot 50 with a valve 51a. Operation of this valve in one direction applies fluid pressure to one fluid piston 42 or 44 and exhausts fluid or connects the other servo motor piston with the fluid outlet. Movement in the other direction applies the fluid pressure to the piston of the other fluid motor and exhausts fluid from the first motor. This fluid servo means for fore and aft tilt of the swash plate is carried by the swash plate frame.

Upon operation of the operating link 35, the enlarged hole 32 permits some independent pivoting of the valve lever 34 without manually operating the cross arm 29. As a consequence the valve is operated to energize one of the fluid pistons 42 or 44 which engages its respective roller 41 or 43 to incline the swash plate in fore and aft direction. If the hydraulic servo means should fail, the link 35 and valve lever will still operate the cross arm to give manual control of the fore and aft tilt operating means for the swash plate.

The swash plate also has a lateral tilt operating means for the swash plate which includes a connecting link 55 located 90° from the link 25. The lower end of this link is connected with a lever 56 carried on a pivot shaft 57 which is journaled in the swash plate frame in axial alignment with the pivot shaft 28 but having no connection therewith. This shaft carries a cross arm 58 which is identical in every respect with the cross arm 29 and hence like parts are similarly numbered. On the bolt corresponding to bolt 33 a valve operating bell crank lever identical with valve lever 34 is mounted for operating a valve 51b identical with the valve 51a. In other words, a vertical section, taken through the servo motors and the valve on this side corresponding with section 3—3, would be identical with the section of Fig. 3. The valve 51b operated by the valve lever 59 controls a pair of servo fluid motors having pistons 60 and 61 for operation of the cross arm 58, the shaft 57, the lever 56 and connecting link 55 to tilt the swash plate in a lateral direction so that with the fore and aft tilt and this lateral tilt, the swash plate may be inclined in any plane relative to the pylon as desired over a range of about 10° to give cyclic pitch control of the blades. The valve operating lever is operated from a link 62 which is connected with the joy or control stick of the aircraft in known manner.

For collective pitch control, at least one but preferably a pair of connecting links 66 and 67 have their lower ends fixed to the pylon in any suitable manner and shown as connected with the pylon frame 38 such as by a pivot 68. One such linkage is provided on each side for smoother operation. The upper end of each link is connected to a lever 69 and 70 respectively each of which is fixed to a shaft 71 which is journaled in the swash plate frame 24. The pivoting of the shaft 71 will therefore raise and lower the entire swash plate mechanism through raising and lowering of the swash plate frame 24.

Hydraulic servo means will normally rotate the shaft 71 and raise and lower the levers 69 and 70 and in order to provide greater power with the same hydraulic motor pistons a double pair of fluid pistons are used to operate the same. The shaft 71 carries a pair of cross arms 75 secured to the shaft in spaced relation each of which cross arms carries a pair of rollers 76 and 77 mounted on pins 78. The upper roller 76 is engaged by its respective piston 79 of the hydraulic servo means which operates the cross arm in a counterclockwise direction as viewed in Fig. 3 to lower the swash plate mechanism. Each lower roller 77 is engaged by a second piston 72 which rotates the cross arm in a clockwise direction as viewed in Fig. 3 to raise the swash plate mechanism. The double pistons used for collective pitch control are of the same diameter as those used for the cyclic pitch control and are in alignment therewith which simplifies manufacture and enables all pistons to be alike in size.

Fluid under-presure to the collective pitch control pistons is controlled by a single valve 83 shown in a vertical position in the swash plate frame 24. Movement of the valve in one direction such as upwardly energizes the lower pair of pistons 72 and exhausts fluid from the chambers or cylinders of the upper pistons 79, swings the levers 70 downwardly and raises the swash plate mechanism. The movement of the valve downwardly energizes the upper pair of pistons and exhausts fluid from the chambers of the lower pistons to swing the levers 70 upwardly to lower the swash plate mechanism. The valve 83 is connected to a link 84 by a pivot 85 and the lower end of the link is pivotally connected by pivot 88 to an operating link 86. The pivot 88 has a loose connection in the swash plate frame 24 such as by an enlarged hole or slot 87 of about .050 of an inch so that movement of the operating link 86 will operate the valve 83. The loose connection or slot 87 is provided so that if the fluid pressure of the servo system should fail, the operating link 86 will have direct connection with the swash plate frame 24 through the pivot 88 engaging the end of the slot 87 to provide manual raising or lowering of the swash plate mechanism with the operating link for collective pitch control of the blades. The valve is operated first therefore for servo operation.

In order to raise the swash plate mechanism for collective pitch control, the operating link 86 is raised by the pilot operating the joy stick in the cabin which raises the valve 83. This connects the center pressure valve groove 102 (Fig. 5) for connection with the passage 98 to an annular passage 97 in an annular ring 92. This annular passage connects with passage 93 in the frame 24 which in turn connects with an annular chamber 94 which surrounds each of the lower pistons 72 and therefore delivers fluid pressure to each of these lower pistons of the collective pitch control servo. The upper pair of pistons 79 are vented through the annular chamber 95, which surrounds each of the upper servo motors, through passage 96 into the annular passage 91, passage 90 to the valve and through the lower annular valve passage 101 and outlet 104. When the valve is moved downwardly connections are made so that the upper pistons are energized by fluid pressure and the lower pair of pistons are connected with an outlet 104.

In the three servo mechanisms, operation of the valve or valve sleeve energizes the servo motor and causes movement of the operating means. The movement of the operating means continues until it has taken up the movement of the valve whereupon the operation ceases until the valve is again moved.

As mentioned above each of the valves are of the same construction and shown in detail in Fig. 5. Each valve includes a slide, 51a and 51b being for cyclic pitch control and 83 being for collective pitch control. Each valve slide has three annular valve passages 101, 102 and 103 in which 102 is connected with the fluid pressure supply and each annular passage 101 and 103 is connected with an outlet passage 104 through the valve wall immediately to the exterior of the swash plate frame so that the servo oil will add to the lubrication. The valve sleeve annular rings 106 and 107 are about the width of its respective part 106a and 107a to close the same when the valve sleeve is in central position. Fluid pressure is always maintained in the center annular valve passage 102. The center annular valve passage 102 is connected with an inlet passage 105 which is connected with the fluid pressure line 130.

For cyclic pitch control, each valve slide 51a and 51b is connected by a passage 108 with its respective lower servo cylinder chamber or motor for pistons 44 and 61 or particularly with an annular motor passage 109 which connects with the cylinder chamber. The upper pistons or servo motors are connected with the valve slide by passage 110 which connects with the annular motor passage 111 around each of the upper servo motors having pistons 42 and 60 for cyclic pitch control.

The swash plate frame 24 is mounted on the lower end of the swash plate sleeve 22 on bearings 24a so that the swash plate sleeve 22 may rotate with respect to the frame which remains non-rotatable. The swash plate frame is held against rotation by a linkage which includes a link 114 pivotally connected with the swash plate frame 24 by a pivot 115 at one end thereof and the other end is connected by a pivot 116 with a vertical link 117. The lower end of link 117 is pivotally connected by a pivot 118 to a bracket 119 which is secured to the pylon frame 38. This linkage preferably carries a suitable stop 120 for limiting the vertical movement of the swash plate frame.

In order to prevent the lubricating oil from being thrown outwardly on the blades to unbalance the same and also to prevent needless waste of lubricating oil, the entire swash plate mechanism is enclosed. The upper portion is enclosed by the drive sleeve 15 and the lower portion is enclosed by a shell 123 which is secured to the bottom frame 38. A swash plate shell 124 is secured at its upper end to the drive plate 16 of the swash plate and the lower end has a flange 125 which engages the inner surface of the shell 123. The flange 125 permits relative vertical movement between the shell 123 and the swash plate shell 124 to maintain an oil seal between these two parts. The entire swash plate mechanism therefore is enclosed by the rotor head 12, drive sleeve 15, swash plate shell 124, shell 123 and the pylon frame 38 which also serves as an oil pan which catches the oil which flows from the swash plate mechanism above. This pylon frame 38 may have a return connection such as pipe 127 for the return of lubricating oil to the reservoir or supply 128. A pump 129 supplies a pressure of about 400 pounds to the servo motor valves through a connection 130 which is flexible at the swash plate mechanism.

In the fluid servo mechanism there is a check valve 131 connected at the end of connection 130 and on the valve side thereof there is connected an accumulator 132 which is essentially a trapped air chamber. If there should be a failure of the oil supply then this accumulator supplies a ten second supply of fluid pressure so that the pilot will have time to take over manual control of the swash plate. A restricted orifice 134 is provided in the accumulator connection and particularly at the entrance of the connection to the accumulator so that if the flexible accumulator connection should break, pressure would still be provided to the valves. A top plate 133 is bolted on the top of the swash plate frame 24 to serve as a retainer for the bearing 24a and the ring 92 and serve also as a funnel for oil from above to be directed to the bearings and other structure.

Each piston and its cylinder or cylinder chamber forms a servo motor of the single acting type and each pair of vertically aligned servo motors constitutes a double acting hydraulic servo means. Four servo motors are in planar alignment in a vertical plane on one side of the vertical central axis of the swash plate frame and mechanism which corresponds with the center of the pylon and the other four servo motors are also in planar alignment in a vertical plane on the other side of the central axis. Pairs of the four servo motors are in axial alignment providing vertical pairs of servo motors forming one double acting servo means. One servo means of each set of four servo motors form a first and second hydraulic servo and one servo means of each set forms the third hydraulic servo for collective pitch control.

The ring 92 has a third annular passage 135 which is connectable with the middle annular passage 97 through a pressure operated valve 136 which is normally held closed by a spring 137 which is received on the valve stem 138. One end of the spring engages a washer on the stem and the other end engages the swash plate frame 24 and presses the valve to closed position. If sufficient pressure is exerted on the end of the valve, the valve is pressed downwardly against the pressure of the spring to connect the upper or third annular passage with the middle annular passage.

This invention is presented to fill a need for improvements in a swash plate operating mechanism and combination with swash plate. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A rotor head mechanism for an aircraft of the helicopter type having a fixed part and adapted to be mounted on a pylon comprising a swash plate mechanism including a swash plate frame having means to mount the same on the pylon for vertical movement thereon, a swash plate, means mounting the swash plate on the frame for rotation and for inclination thereon, fore-and-aft tilt operating means carried by the swash plate frame and connected with the swash plate to tilt the same fore-and-aft, lateral tilt operating means carried by the swash plate frame and connected with the swash plate to tilt the same laterally, collective operating means connected with the swash plate frame and having means for connection with a fixed part of the aircraft to raise and lower the swash plate frame and swash plate with respect to the pylon for collective pitch control of the blades, a first hydraulic servo carried by the swash plate frame and connected with the fore-and-aft tilt operating means to operate the same, a first valve means carried by the swash plate frame and connected with and controlling the operation of the first hydraulic servo means, a second hydraulic servo carried by the swash plate frame and connected with the lateral tilt operating means to operate the same, a second valve means carried by the swash plate frame and connected with and controlling the second hydraulic servo to operate the same, a third hydraulic servo carried by the swash plate frame and connected with the collective operating means to operate the same, a third valve means carried by the swash plate frame and connected with and controlling the operation of the third hydraulic servo, each valve means having an outlet passage to a surface of the swash plate frame and open at the surface for discharge to the surrounding area, and means connected with the swash plate frame to retain the same against rotation.

2. A rotor head mechanism as in claim 1 including a housing surrounding the swash plate mechanism, the three valve means each having an inlet and an outlet, a source of lubricating oil, a pump connected through a restricted feed line with the inlet for each valve constituting the sole restricted line for the three valve means, and the valve outlet passages in the swash plate frame being open and discharging within the interior of the housing.

3. A rotor head mechanism as in claim 2 in which the swash plate mechanism includes a drive plate connected with the swash plate mounting means to rotate the same, a bottom frame, the housing including a swash plate shell surrounding the upper part of the swash plate mechanism and secured to the drive plate and having a lower edge, a fixed shell surrounding the lower part of the swash plate mechanism and secured to the bottom frame, and the lower edge of the swash plate shell engaging the inside of the fixed shell for rotation and relative vertical movement.

4. A rotor head mechanism for an aircraft of the helicopter type having a fixed bottom frame and adapted to be mounted on a pylon comprising a swash plate mechanism including a swash plate frame having means to mount the same on the pylon for vertical movement thereon, a swash plate, means mounting the swash plate on the frame for rotation and for inclination thereon, fore-and-aft tilt operating means carried by the swash plate frame and connected with the swash plate to tilt the same fore-and-aft, lateral tilt operating means carried by the swash plate frame and connected with the swash plate to tilt the same laterally, collective operating means connected with the swash plate frame and having means for connection with a fixed part of the aircraft to raise and lower the swash plate frame and swash plate with respect to the pylon for collective pitch control of the blades, a first hydraulic servo carried by the swash plate frame and connected with the fore-and-aft tilt operating means to operate the same, a first valve means carried by the swash plate frame and connected with and controlling the operation of the first hydraulic servo means, a second hydraulic servo carried by the swash plate frame and connected with the lateral tilt operating means to operate the same, a second valve means carried by the swash plate frame and connected with and controlling the second hydraulic servo to operate the same, a third hydraulic servo carried by the swash plate frame and connected with the collective operating means to operate the same, a third valve means carried by the swash plate frame and connected with and controlling the operation of the third hydraulic servo, means connected with the swash plate frame to retain the same against rotation, the swash plate mechanism has a vertical axis and the servo means includes eight single acting servo motors of which a set of four are in planar alignment in a vertical plane on one side of the vertical axis and a set of four are in planar alignment in a vertical plane on the other side of the vertical axis, each group of four having two pairs of pistons in axial alignment and each vertical pair forming a single double acting servo means, a servo means of one set forming the first hydraulic servo, a servo means of the other set forming the second hydraulic servo, and a servo means of each set forming the third hydraulic servo.

5. A swash plate operating mechanism for an aircraft of the helicopter type adapted to be mounted on a swash plate means mounted on the pylon for vertical movement thereon and including a swash plate comprising a swash plate frame, means carried by the frame for mounting the same on a swash plate means, fore-and-aft tilt operating means carried by the swash plate frame and including a link adapted to be connected with the swash plate to tilt the same fore-and-aft, lateral tilt operating means carried by the swash plate frame and including a link adapted to be connected with the swash plate to tilt the same laterally, collective operating means carried by the swash plate frame and including a link adapted to be connected with a fixed part of a helicopter to raise and lower the swash plate frame with respect to the pylon for collective pitch blade control, a first hydraulic servo carried by the swash plate frame and connected with the fore-and-aft tilt means to operate the same, a first valve means connected with and controlling the operation of the first hydraulic servo, a second hydraulic servo carried by the swash plate frame and connected with the lateral tilt means to operate the same, a second valve means connected with and controlling the second hydraulic servo to operate the same, a third hydraulic servo carried by the swash plate frame and connected with the collective operating means to operate the same, a third valve means connected with and controlling the operation of the third hydraulic servo, each of the valve means includes an outlet passage means through the swash plate frame from the valve to an open end at the surface of the frame.

6. A swash plate operating mechanism for an aircraft of the helicopter type adapted to be mounted on a swash plate means mounted on the pylon for vertical movement thereon and including a swash plate comprising a swash plate frame, means carried by the frame for mounting the same on a swash plate means, fore-and-aft tilt operating means carried by the swash plate frame and including a link adapted to be connected with the swash plate to tilt the same fore-and-aft, lateral tilt operating means carried by the swash plate frame and including a link adapted to be connected with the swash plate to tilt the same laterally, collective operating means carried by the swash plate frame and including a link adapted to be connected with a fixed part of a helicopter to raise and lower the swash plate frame with respect to the pylon for collective pitch blade control, a first hydraulic servo carried by the swash plate frame and connected with the fore-and-aft tilt means to operate the same, a first valve means connected with and controlling the operation of the first hydraulic servo, a second hydraulic servo carried by the swash plate frame and connected with the lateral tilt means to operate the same, a second valve means connected with and controlling the second hydraulic servo to operate the same, a third hydraulic servo carried by the swash plate frame and connected with the collective operating means to operate the same, a third valve means connected with and controlling the operation of the third hydraulic servo, the swash plate mechanism having a vertical axis and the servo means includes eight single acting servo motors of which a set of four are in planar alignment in a vertical plane on one side of the vertical axis and a set of four are in planar alignment in a vertical plane on the other side of the vertical axis, each group of four having two pairs of pistons in axial alignment and each vertical pair forming a single double acting servo means, a servo means of one set forming the first hydraulic servo, a servo means of the other set forming the second hydraulic servo, and a servo means of each set forming the third hydraulic servo.

7. A swash plate operating mechanism as in claim 1 including a check valve at the inlet to the valves, an accumulator, a connection from the valve side of the check valve to the accumulator and a restricted orifice in the connection to the accumulator.

8. As in claim 7 including valve means in the connection to the accumulator including the restrictive orifice to the accumulator and a check valve offering unrestricted flow outwardly from the accumulator.

9. A rotor head mechanism for an aircraft of the helicopter type having a fixed bottom frame and adapted to be mounted on a pylon comprising a swash plate mechanism including a swash plate frame having mounting means to mount the same on the pylon for vertical movement thereon, a swash plate, and means mounting the swash plate on the frame for rotation and for inclination thereon; fore-and-aft tilt operating means carried by the swash plate frame and connected with the swash plate to tilt the same fore-and-aft; lateral tilt operating means carried by the swash plate frame and connected with the swash plate to tilt the same laterally; each of the fore-and-aft tilt operating means and the lateral tilt operating means includes a shaft having an axis, the two shafts being on the same axis, a rocker arm on the shaft, a valve lever pivotally mounted on the rocker arm spaced from the shaft axis and having limited pivotal movement with respect to the rocker arm; collective operating means to raise and lower the swash plate frame and swash plate with respect to the pylon for collective pitch control of the blades including a collective shaft having ends and pivotally mounted in the swash frame, the collective shaft being on the opposite side of the pylon mounting means from the other shafts, an arm carried at each end of the shaft, a link connected at one end to each arm, means on the other end of the link for connection with a fixed bottom frame; a first hydraulic servo carried by the swash plate frame and connected with the rocker arm for the fore-and-aft tilt operating means to operate the same, a first valve means carried by the swash plate frame and connected with and controlling the operation of the first hydraulic servo means, a second hydraulic servo carried by the swash plate frame and connected with the rocker arm for the lateral tilt operating means to operate the same, a second valve means carried by the swash plate frame and connected with and controlling the second hydraulic servo to operate the same, a third hydraulic servo carried by the swash plate frame and connected with the collective operating means shaft to operate the same, a third valve means carried by the swash plate frame and connected with and controlling the operation of the third hydraulic servo, and means connected with the swash plate frame to retain the same against rotation, the swash plate mechanism having a vertical axis and the three hydraulic servos include eight single acting servo motors of which a set of four are in planar alignment in a vertical plane on one side of the vertical axis and a set of four are in planar alignment in a vertical plane on the other side of the vertical axis, each group of four having two pairs of pistons in axial alignment and each vertical pair forming a single double acting servo means, a servo means of one set forming the first hydraulic servo, a servo means of the other set forming the second hydraulic servo, and the remaining servo means of each set forming the third hydraulic servo, and an outlet passage from each of the valve means to the surface of the swash plate frame and open for discharge to the surrounding area.

10. A rotor head mechanism for an aircraft of the helicopter type having a fixed part and adapted to be mounted on a pylon comprising a swash plate mechanism including a swash plate frame having means to mount the same on the pylon for vertical movement thereon, a swash plate, mounting means mounting the swash plate on the frame for rotation and for inclination thereon, a first hydraulic servo carried by the swash plate frame and connected with the swash plate in a fore-and-aft position to tilt the same, a first valve means carried by the swash plate frame and connected with and controlling the operation of the first hydraulic servo means, a second hydraulic servo carried by the swash plate frame and connected with the swash plate in a lateral position to laterally tilt the same, a second valve means carried by the swash plate frame and connected with and controlling the second hydraulic servo to operate the same, a third hydraulic servo carried by the swash plate frame and adapted to be connected with the fixed part to raise and lower the same, a third valve means carried by the swash plate frame and connected with and controlling the operation of the third hydraulic servo, each valve means having an outlet passage to a surface of the valve and open at the surface for discharge to the surrounding area, and means connected with the swash plate frame to retain the same against rotation.

References Cited in the file of this patent
UNITED STATES PATENTS

| | | |
|---|---|---|
| 2,540,543 | Neville | Feb. 6, 1951 |
| 2,557,338 | Caldwell | June 19, 1951 |
| 2,703,147 | Peterson | Mar. 1, 1955 |
| 2,745,500 | Moore | May 15, 1956 |
| 2,780,423 | De Cenzo | Feb. 5, 1957 |

FOREIGN PATENTS

| | | |
|---|---|---|
| 504,803 | Canada | Aug. 3, 1954 |
| 698,712 | Great Britain | Oct. 21, 1953 |